(12) United States Patent
Rien et al.

(10) Patent No.: US 10,601,525 B2
(45) Date of Patent: Mar. 24, 2020

(54) POWER DISTRIBUTION FOR FUNCTIONAL CIRCUIT BLOCKS

(71) Applicant: Arm Limited, Cambridge (GB)

(72) Inventors: Mikael Yves Marie Rien, Bernin (FR); Subbayya Chowdary Yanamadala, Dallas, TX (US)

(73) Assignee: ARM LIMITED, Cambridge (GB)

( * ) Notice: Subject to any disclaimer, the term of this patent is extended or adjusted under 35 U.S.C. 154(b) by 5 days.

(21) Appl. No.: 15/958,206

(22) Filed: Apr. 20, 2018

(65) Prior Publication Data

US 2019/0327004 A1 Oct. 24, 2019

(51) Int. Cl.
*H04B 15/02* (2006.01)
*H04B 3/54* (2006.01)

(52) U.S. Cl.
CPC ............. *H04B 15/02* (2013.01); *H04B 3/542* (2013.01)

(58) Field of Classification Search
CPC ................. H04B 15/02; H04B 3/542
USPC .......................................................... 333/12
See application file for complete search history.

(56) References Cited

U.S. PATENT DOCUMENTS

| | | | |
|---|---|---|---|
| 6,480,989 B2 * | 11/2002 | Chan | G06F 17/5068 257/211 |
| 2013/0307613 A1 * | 11/2013 | Tham | H03B 1/04 327/551 |

FOREIGN PATENT DOCUMENTS

| | | |
|---|---|---|
| EP | 1863218 A1 | 12/2007 |
| WO | 2006052360 A1 | 5/2006 |

OTHER PUBLICATIONS

Maloberti, F. "Basic building blocks, Analog design for CMOS VLSI systems", Laboratorio di Microsistemi Integrati, University degli Studi di Pavia, Pavia, Italy, Nov. 2006 (Year: 2006).*
"Wireless Transceivers RF CMOS Front Ends", A guest post by Altis Semiconductor, published on Any Silicon website Mar. 18, 2015 (Year: 2015).*
MT-101, "Decoupling Techniques", Rev. 0, Mar. 2009, Tutorial by Analog Devices (Year: 2009).*
International Search Report and Written Opinion issued in PCT/GB2019/050677, dated May 28, 2019, 13 pages.

* cited by examiner

*Primary Examiner* — Benny T Lee
*Assistant Examiner* — Hafizur Rahman
(74) *Attorney, Agent, or Firm* — Talem IP Law, LLP (57) ABSTRACT

A system incorporating a power distribution for functional circuit blocks can include a functional circuit block comprising two or more sub-circuits; a power line comprising at least two segments, a first sub-circuit of the two or more sub-circuits being coupled to a first segment of the at least two segments, and a second sub-circuit of the two or more sub-circuits being coupled to a second segment of the at least two segments; and at least one power delivery circuit (PDC) coupled to the power line at a location to create an electromagnetic flux on two adjacent segments of the at least two segments that is in opposite directions. The PDCs can be arranged coupled to the power line with a number and at locations optimized for mitigating electromagnetic emissions on the power line.

10 Claims, 7 Drawing Sheets

POWER DISTRIBUTION FOR FUNCTIONAL CIRCUIT BLOCKS

BACKGROUND

Signals transmitted along electrical wires, including power lines, emit electromagnetic radiation. The electromagnetic radiation can cause interference with nearby circuitry, resulting in crosstalk on the power lines. The electromagnetic emissions can fluctuate as signals are transmitted, indicating certain operations within a circuit. These electromagnetic emissions can be monitored to try to identify data or particular operation during the execution of code. In certain cases, such as during transmission of secure or sensitive information, it may desirable to transmit signals that cannot be detected or measured from information leakage.

BRIEF SUMMARY

Power distribution for functional circuit blocks is described herein. The described power distribution and corresponding circuitry can mitigate electromagnetic susceptibility of a circuit. An implementation of a system incorporating power distribution can include a functional circuit block with two or more sub-circuits, a power line having at least two segments, and at least one power delivery circuit (PDC) coupled to the power line. The PDCs are coupled to locations of the power line in order to cause electromagnetic flux on the power line to have mixed directions. A first sub-circuit of the two or more sub-circuits can be coupled to a first segment of the at least two segments of the power line, and a second sub-circuit of the two or more sub-circuits can be coupled to a second segment of the at least two segments of the power line. A PDC of the at least one PDCs can be coupled to the power line such that electromagnetic flux on the first segment is in opposite direction to the electromagnetic flux on the second segment.

A computer-implemented method for applying electromagnetic mitigation though power distribution is also described herein. An implementation of the method can include auto-placing at least one PDC cell along a power line segment, and then simulating the electromagnetic flux expected from the functional circuit block and updating PDC placement until the direction of the electromagnetic flux for each adjacent segment is optimized for mitigating electromagnetic emissions on the power line. The program can select a number of PDC to use based on circuit area overhead, susceptibility requirements, and/or power requirements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Power distribution for functional circuit blocks is described herein. The described power distribution and corresponding circuitry can mitigate electromagnetic susceptibility of a circuit.

Current on a line can generate electromagnetic radiation. Further, functional circuit blocks can contain components that emit electromagnetic radiation when in use. For example, logic blocks can draw or output current when transitioning between logic states. The current can be detectable upon the power lines powering the circuit block. In addition, the transition of a logic block from a low to a high logic state has a different power signature on the power line than a high to low transition. The current on a power line can cause electromagnetic interference, such as crosstalk, with other circuitry sharing the power line or in proximity to the power line.

In addition to creating interference with other circuitry, the current on the lines may be a source of information leakage. By monitoring the power lines, the pattern of electromagnetic emission can be detected, and information gained from this monitoring can be used to attack, or hack, the circuit block and the data contained within the block. Such an attack can be referred to as a side channel attack (SCA), and typically involves a method of attack that derive sensitive information based on the physical implementation of a circuit block, or system. Typically, electromagnetic emissions can be measured, for example, using a probe, a sensor, or an antenna at different locations along a power line.

Addressing the electromagnetic emissions on power lines can be useful in applications that are sensitive to such emissions due to a secure nature of the application of the circuitry, the sensitivity of the circuit to interference, or both. Examples of applications of the described techniques of power distribution include an analog front end (AFE) of a radio frequency (RF) circuit and a secure system in which protected signals are desired.

As used herein, when reference is made to a power lines, the power line may be a voltage source line (e.g., VDD) or a first voltage line (e.g., VSS). In some cases, the voltage source line is a positive voltage rail. In some cases, the first voltage line is a ground line or a negative voltage rail. In some cases, voltage source line and the first voltage line are connected to positive voltage sources and the voltage value of one line is higher than the voltage value of the other. In some cases, the two lines have a negate voltage, with one line having a higher magnitude than the other.

A functional circuit block (or "circuit block") as described herein can be an analog circuit, a digital circuit, or a mixed signal circuit. The circuit block may be a functional block or group of functional blocks. In some cases, a functional block or group of functional blocks can implement a crypto-hardware accelerator such as an AES (advanced encryption standard) engine, a PKA (public key crypto manager), a SHA (secure hash algorithm), or RNG (random number generator). A group of functional blocks can form a crypto/security subsystem or an entire integrated circuit (IC).

Figure 1:
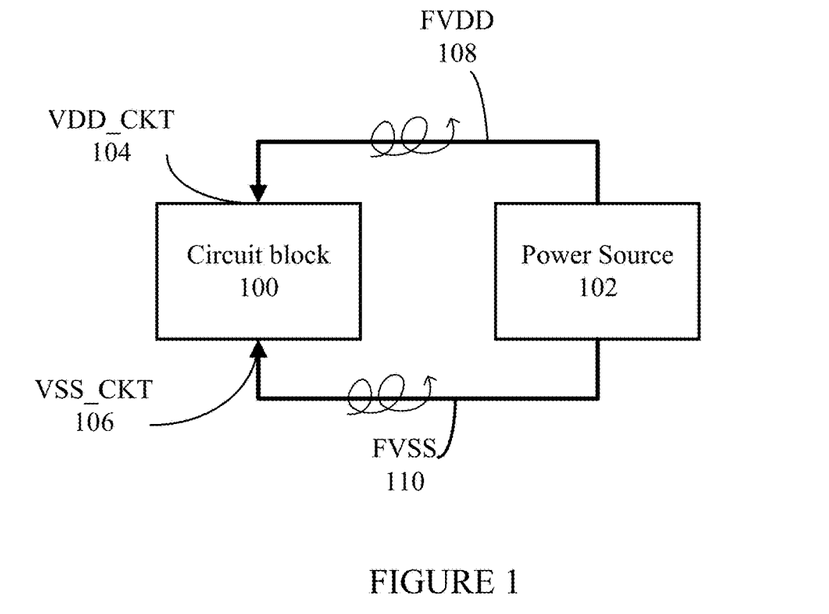
FIG. 1 shows an example of a typical implementation of a single power source delivering power to a circuit block.

Typically, a single power source may be used to power a circuit block or group of circuit blocks. FIG. 1 shows an example of a typical implementation of a single power source delivering power to a circuit block. Circuit block 100 is electrically coupled to a power source 102. The power source includes a voltage source, $V_{DD}$, and a first voltage, $V_{SS}$. The coupling of circuit block 100 to $V_{DD}$ is at $V_{DD\_CKT}$ 104. The coupling of circuit block 100 to $V_{SS}$ is at $V_{SS\_CKT}$ 106. The electromagnetic emissions (or "flux"), shown as coiled arrows, from power source 102 can be readily monitored at $F_{V_{DD}}$ 108 and $F_{V_{SS}}$ 110 and potentially interfere with other circuitry on the chip.

Figure 2:
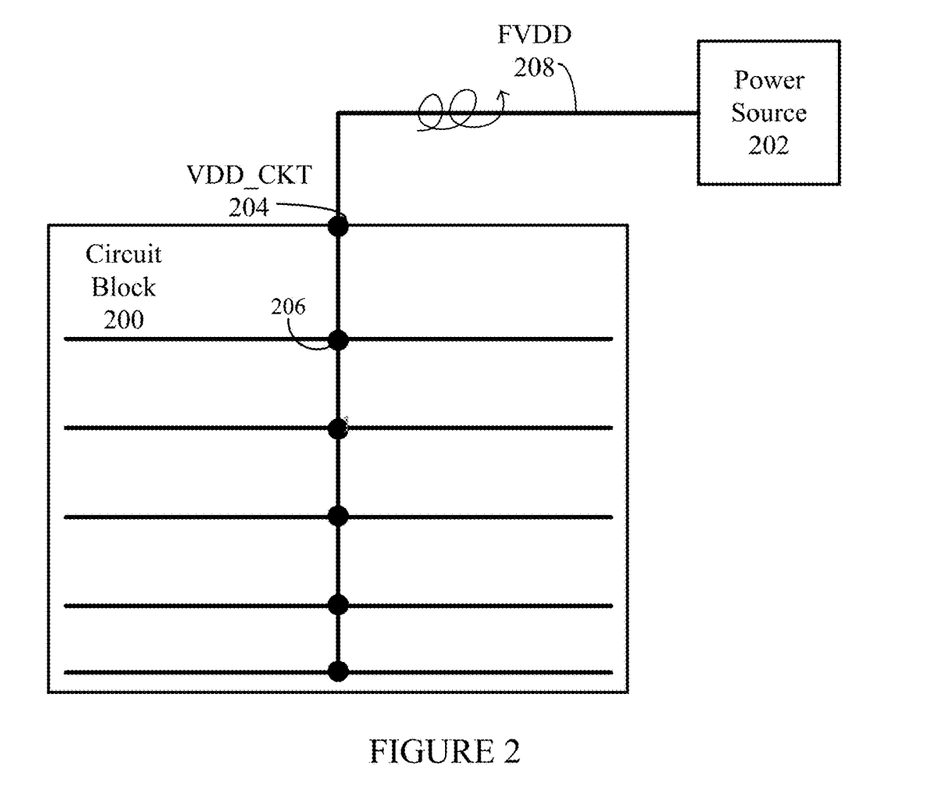
FIG. 2 shows an example implementation of power distributed within a circuit block.

FIG. 2 shows an example implementation of power distributed within a circuit block. In this implementation, circuit block 200 is coupled to a power source 202. The power source provides a voltage source, $V_{DD}$, and a first voltage, $V_{SS}$. The coupling of circuit block 200 to $V_{DD}$ is at $V_{DD\_CKT}$ 204. For simplicity, the coupling of circuit block 200 to $V_{SS}$ at $V_{SS\_CKT}$ is not shown. In this implementation, the power lines are distributed within the circuit block 200 in a mesh configuration, providing a primary power distribution network. Current flowing from $V_{DD\_CKT}$ 204 is divided at nodes within the mesh, for example, at node 206. Similar to FIG. 1, with a single power source 202, the electromagnetic emissions (flux) from the power source can still be readily measured at $F_{V_{DD}}$ 208 and $F_{V_{SS}}$ (not shown) and potentially interfere with other circuitry on the chip.

Through the described configurations and techniques, electromagnetic emissions of a circuit block can be mitigated. One approach to mitigating the electromagnetic emissions on the power lines is to reduce the electromagnetic emissions within the circuit block itself. A circuit block design that implements small power delivery circuits (PDCs) to optimize the mitigation of electromagnetic emissions is described herein.

The PDC can be anything that can deliver power (and include active components, passive components, or both). For example, in some cases, a PDC includes at least one capacitor. The at least one capacitor can be charged (and recharged) by a control circuit. The control circuit can be programmed to recharge the at least one capacitor at specified intervals (periodic or aperiodic) or based on a detected threshold level. In some cases, a PDC includes at least one transistor. The at least one transistor can be driven by a control circuit, such as a regulator. The at least one transistor can be any type of transistor, including, but not limited to, a pMOS transistor, a nMOS transistor, or a bipolar transistor. The PDCs create punctuated power source routing and can limit or break up the strength of electromagnetic emission. The PDCs can also supply power to sub-circuits within the circuit block without changing the functionality of the circuit block.

In some cases, PDCs can be discrete components embedded within a printed circuit board (PCB) or may be individual chips on the PCB. At the PCB level, PDCs can be used to inhibit the effectiveness of side channel attacks. In some cases, PDCs are used within a circuit block at the IC level. In some cases, PDCs are provided at both the chip level and the PCB level.

Figure 3A:
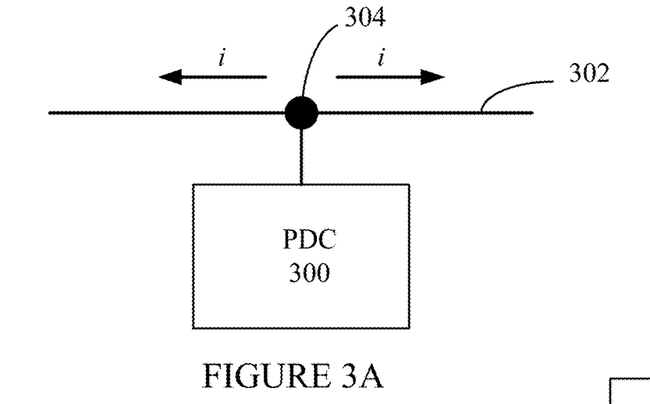
FIGS. 3A-3C show three example configurations of PDC arrangements.
Figure 3B:
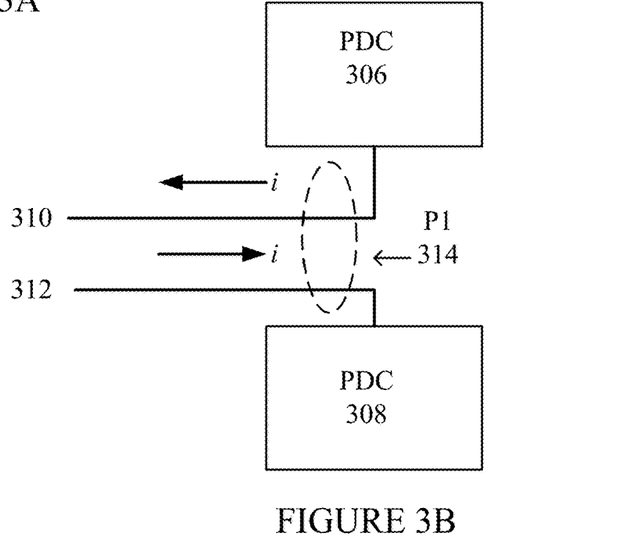
Figure 3C:
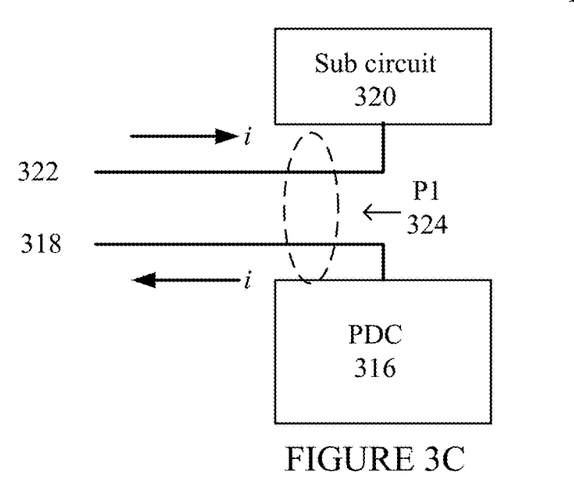

FIGS. 3A-3C show three example configurations of PDC arrangements. As mentioned above, PDCs can be located on a power line so as to break up the fields into small local fields, mitigating electromagnetic emission. The small local fields can make it more difficult to identify activity on a circuit. In FIG. 3A, a single PDC 300 is coupled to a voltage source line 302 between two adjacent segments of the power line (that are in series). In this example, the PDC 300 generates a current equal to 2i. FIG. 3A shows that the current is split in equal and opposite directions at node 304. Of course, it should be understood that the amount of current and direction of current branching from node 304 is dependent on the other circuitry on the line and may be designed to have an uneven split between the two adjacent segments. It is apparent that if a probe is placed at node 304 or on either of the two segments, the measured electromagnetic emissions would be reduced due to the opposing currents at node 304. Similarly, any antenna near either of the two segments would pick up only a small local field.

In FIG. 3B, two PDCs 306 and 308 are located on parallel adjacent segments 310 and 312 of a power line, respectively. In this example, the current generated by each PDC is equal to i. Of course, in some cases, the magnitude of the current on the parallel adjacent segments of a power line can be different. FIG. 3B shows that the current generated from each PDC flows in opposite directions. When a probe/antenna is placed at probing location P1 314, the measured electromagnetic emissions would be reduced due to the opposing current direction (and therefore intentionally interfering flux) at 314.

In FIG. 3C, a single PDC 316 is coupled to a segment 318 of a power line (for example, a voltage source line) at a location near where a parallel adjacent segment 322 is expected to have current in one direction due to a sub-circuit 320 coupled thereto. In this example, the PDC is configured to generate a current in the opposite direction as that flowing on the parallel adjacent segment 322, for example due to the sub-circuit 320 drawing current. The currents may both be equal to i. When a probe is placed at probing location P1 324, the measured electromagnetic emissions would be reduced due to equal and opposite current at 324. Of course, in some cases, the magnitude of the current on the parallel adjacent segments of a power line can be different. However, the electromagnetic interference of the two segments can mitigate electromagnetic susceptibility of the circuit.

Figure 4:
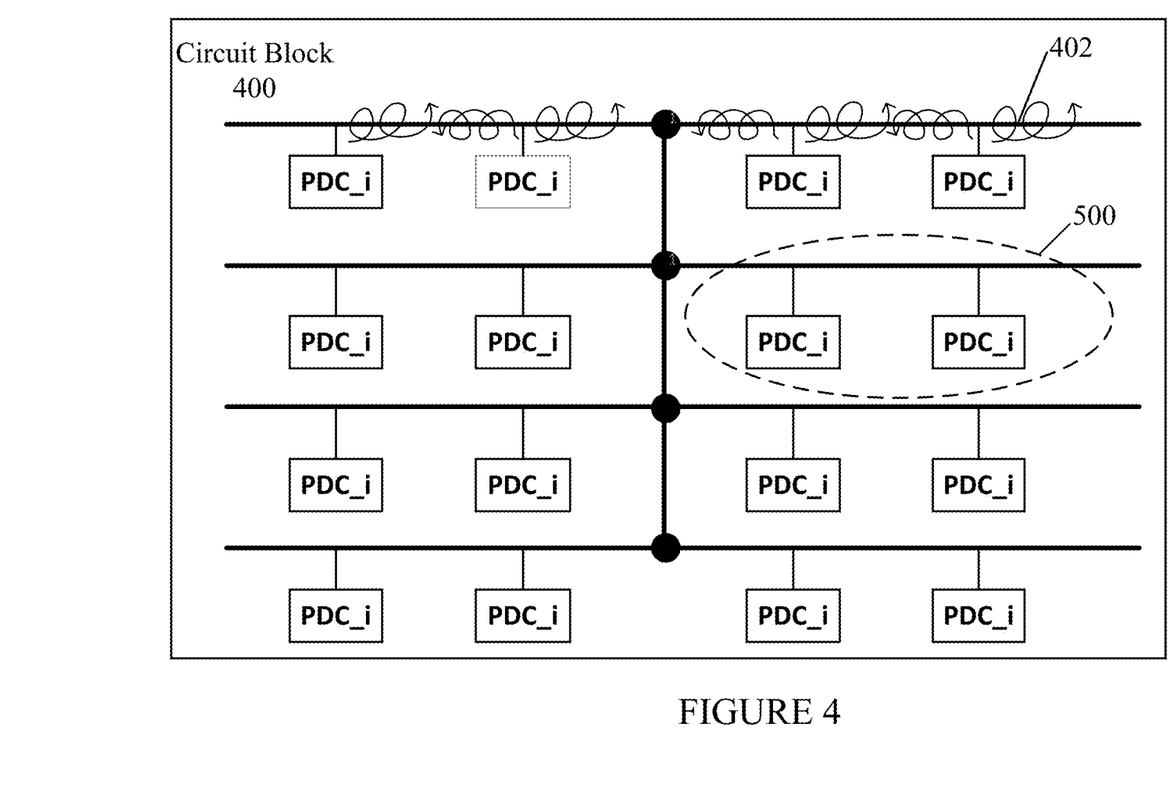
FIG. 4 shows an example implementation of a power distribution for a circuit block.

FIG. 4 shows an example implementation of a power distribution for a circuit block. Referring to FIG. 4, a circuit block C1 400 can have multiple PDCs coupled to a power line mesh. In this example, the power line mesh can be for $V_{DD}$. Within circuit block 400, $V_{DD}$ and $V_{SS}$ are delivered to components through a power mesh architecture, such as described with respect to FIG. 2. However, in FIG. 4, PDCs are distributed along each power line, for example, line 402, within the power mesh. The PDCs can deliver small amounts of power to sub-regions within the circuit block 400, such as sub-region 500. The PDCs are labeled as PDC_i, where i>1 to indicate a multitude of PDCs, not a singular PDC. The electromagnetic flux radiated from each PDC_i along line 402 is shown by a spiraling arrow, where each arrow indicates the direction of the electromagnetic flux along line 402. In some cases, the direction of electromagnetic flux can be controlled by control circuitry (not shown) coupled to the PDCs in circuit block 400. The control circuitry can either be internal to circuit block 400 (e.g., by being one or more sub-circuits of 400) or external to circuit block 400 (e.g., by being in another circuit block). In some cases, the direction of electromagnetic flux of each PDC can be directed by the arrangement of each PDC along line 402 (while taking into account the circuit cells) in such a manner that the electromagnetic fluxes are in mixed directions. The electromagnetic fluxes in opposite, mixed directions can optimize the mitigation of electromagnetic emissions on the power line. For example, when measured, multiple small local electromagnetic emissions would be captured, inhibiting "big picture" information from C1.

Figure 5A:
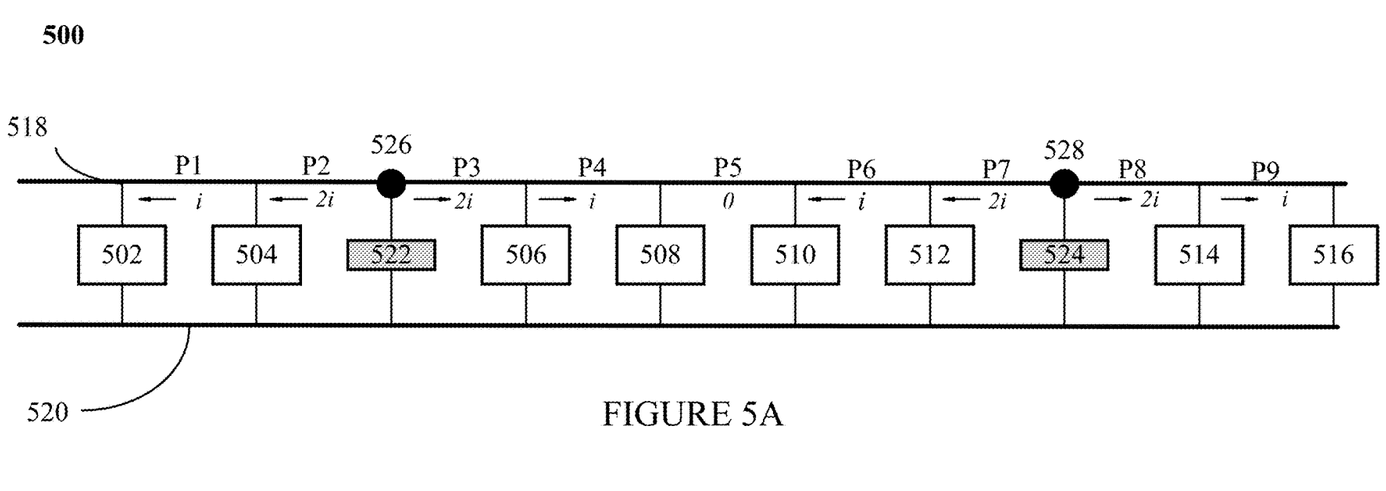
FIG. 5A shows a magnified view of an arrangement of PDCs within a circuit block in which electromagnetic flux is reduced.

FIG. 5A shows a magnified view of an arrangement of PDCs within a sub-region 500 of a circuit block in which electromagnetic flux is reduced. The sub-region 500 can also be seen in relation to the circuit block 400 as shown in the dashed region 500 in FIG. 4. Referring again to FIG. 5A, in this implementation, a plurality of sub-circuits 502, 504, 506, 508, 510, 512, 514, 516 are arranged on power lines, particularly a voltage source line 518 and a first voltage line 520. Interspersed amongst the collection of sub-circuits are PDC_1 522 and PDC_2 524. PDC_1 and PDC_2 are placed and routed along the power lines in an optimized arrangement that reduces electromagnetic flux at probing locations P1 through P9. For illustrative purposes, the current drawn by each sub-circuit is i and PDC_1 and PDC_2 may deliver power to the power line such that the current delivered by each PDC_1 and PDC_2 is 4i. At node 526, the current from PDC_1 522 is divided and can flow in equal and opposite directions. Similarly, at node 528, the current from PDC_2 524 is divided and can flow in equal and opposite directions. The current measured at each probing location is shown in Table 1.

TABLE 1

| Probe position | Current measured at probe position |
|---|---|
| P1 | 1i |
| P2 | 2i |
| P3 | 2i |
| P4 | 1i |
| P5 | Nothing |
| P6 | 1i |
| P7 | 2i |
| P8 | 2i |
| P9 | 1i |

Electromagnetic flux is dependent on the direction of current flow. Thus, the electromagnetic flux can be reduced or cancelled (i.e., mitigated) by positioning, or orienting, the PDCs in a manner to create electromagnetic flux in opposing directions. In FIG. 5A, it is clear to see how the PDC_i power delivery circuits can be instantiated to limit, as much as possible, a direct link between circuit block activity and its electromagnetic emissions. The number and type (e.g., capacitor, transistor) of PDCs placed within a circuit block may depend on several factors, including, but not limited to the power demands of the circuit block, level of desired susceptibility protection of the circuit block, and area overhead constraints of the circuit block. More, and smaller, PDCs may be needed as the desired level of susceptibility protection increases. It should be understood that FIG. 5A is shown as an illustrative example. Other configurations with varying quantities of PDCs and sub-circuits are also possible depending on the circuit block and the factors listed above.

Figure 5B:
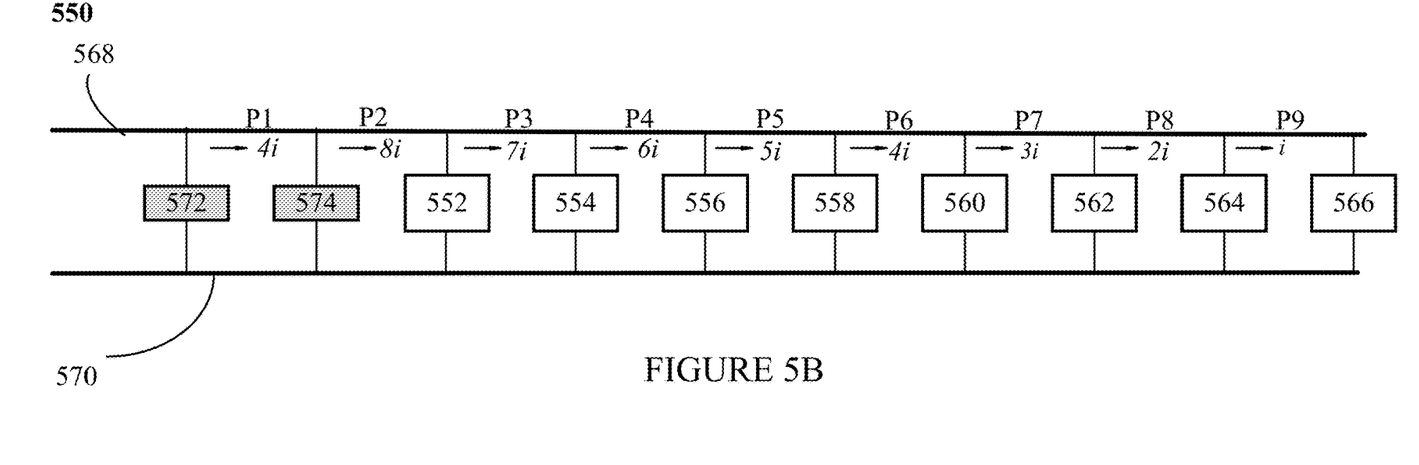
FIG. 5B shows an example illustration of a magnified arrangement of PDCs within a circuit block in which electromagnetic flux is not reduced.

Simply adding PDCs to a circuit block does not reduce electromagnetic emissions at probing locations. The placement of PDCs in relation to the sub-circuits is also important. FIG. 5B shows an example illustration of a magnified arrangement of PDCs within a sub-region 550 of a circuit block in which electromagnetic flux is not reduced. FIG. 5B features the same number of PDCs and sub-circuits, with each PDC generating the same current and each sub-circuit drawing the same current, as FIG. 5A. In FIG. 5B, a plurality of sub-circuits, 552, 554, 556, 558, 560, 562, 564, 566, are arranged on power lines that including a voltage source line 568 and a first voltage line 570. Also arranged on the power lines are two PDCs, PDC_1 572 and PDC_2 574, which are adjacent to each other rather than interspersed (as in FIG. 5A) amongst the plurality of sub-circuits. As shown in Table 2, the current measurements at probing locations P1 through P9 are completely different than that shown in Table 1 due to the placement of the PDCs within the circuit block. For example, in the implementation of FIG. 5A, the highest current detectable by a probe is 2i, whereas in the implementation of FIG. 5B, the highest current detectable by a probe is 8i (the total current draw of the sub-circuits on the power line).

TABLE 2

| Probe position | Current measured at probe position |
|---|---|
| P1 | 4i |
| P2 | 8i |
| P3 | 7i |
| P4 | 6i |
| P5 | 5i |
| P6 | 4i |
| P7 | 3i |
| P8 | 2i |
| P9 | 1i |

The differences in current at various probing locations in FIG. 5A compared to FIG. 5B show that the placement of PDCs is important. The design process for electronic circuits includes a step for placement of circuit elements and routing of wires and interconnections. This can be carried out at the chip level—for integrated circuits or a field programmable gate array—or at a circuit board level—for printed circuit boards or other circuit packages. Electronic design automation (EDA) tools, such as available through Cadence Design Systems, Inc. and Synopsys, Inc., are used during the place and route stage to optimize arrangements and enable increased complexity in design (as compared to manual layout).

The physical design stage of an integrated circuit design process generally includes logic synthesis, floor planning, power planning, placement, clock tree synthesis, routing, verification, and "tapeout" (export of data in form for manufacturing). These stages may be carried out using associated tools that may individually or together form an EDA tool. For example, in one EDA tool with automatic place and route (APR) software, a gate-level netlist, which may be obtained from a logic synthesis tool (as part of the logic synthesis stage), is physically implemented in a layout by placing standard-cell layout (placement stage) and then auto-routing cells (routing stage) based on the connections inferred from the netlist. Where the APR software is separate from that used in the subsequent stages, the routed design can be exported from the APR tool in a format that can be understood by post analysis tools such as extraction or power analysis tools.

A power delivery module (PDM) can be part of this design process and included in an EDA tool. The PDM can perform processes for determining an optimized attachment arrangement for PDCs on a power line based on mitigating electromagnetic emissions on the power line and placing the PDCs accordingly. The PDM can perform the following method steps for determining the optimized attachment arrangement: placing at least one PDC along a power line segment, and simulating the electromagnetic flux expected from the functional circuit block and updating PDC placement until the direction of the electromagnetic flux for each adjacent segment is optimized for mitigating electromagnetic emissions on the power line. In some cases, first placement of the PDCs can be based on an initial simulation of the electromagnetic flux expected from the functional circuit block. In some cases, first placement of the PDCs can be based on a designer's selection. Simulation can then be carried out to determine not only optimal placement for optimal flux minimization or reduction, but also optimal numbers and placement for area cost.

The direction of electromagnetic flux can be determined to be optimized when at least two adjacent segments of a power line have opposite electromagnetic flux. The PDM can also determine the number and type of PDCs used in the functional circuit block based on the factors previously discussed. The type of PDCs may be selected, for example, from a capacitor-based PDC cell and a transistor-based PDC cell. One or both may be used for a same circuit block. The number of PDC may be based on the power requirements of the circuit block, the desired level of susceptibility protection of the circuit block, the area overhead constraints of the circuit block, or a combination thereof.

In some cases, layout techniques, with respect to power lines, can be utilized in order to optimize the mitigation of electromagnetic emissions. For example, the direction of current flow can be managed in the layout. The current in a circuit block is proportional to the amount of load placed on signal nets and is also dependent on the length of the signal nets. By managing the current, electromagnetic flux can be created in different directions. Since the electromagnetic flux depends on the direction of current flow, the electromagnetic flux can be reduced by positioning, or orienting, the PDCs in an attachment arrangement to create electromagnetic flux in opposing directions. Other placement and routing concerns should be taken into account when determining positioning, or orienting, of PDCs, such as avoiding the creation of adversarial electrical effects on the wiring or devices within the circuit block.

Layout techniques are commonly employed when placing and routing components within a circuit. One example layout technique may be to place and route components such that power lines are continuous. Continuous power lines are typically used because continuous power lines can minimize resistance and power consumption of the circuit block. In a continuous power line, current flows uninterrupted and in the same direction. However, the layout techniques employed when placing and routing PDCs in a circuit block will differ. When placing and routing PDCs along power lines, power lines are punctuated with PDCs to break up the flow and direction of current along the power lines such that the electromagnetic flux on adjacent power lines within the power mesh is minimized or cancelled.

Figure 6A:
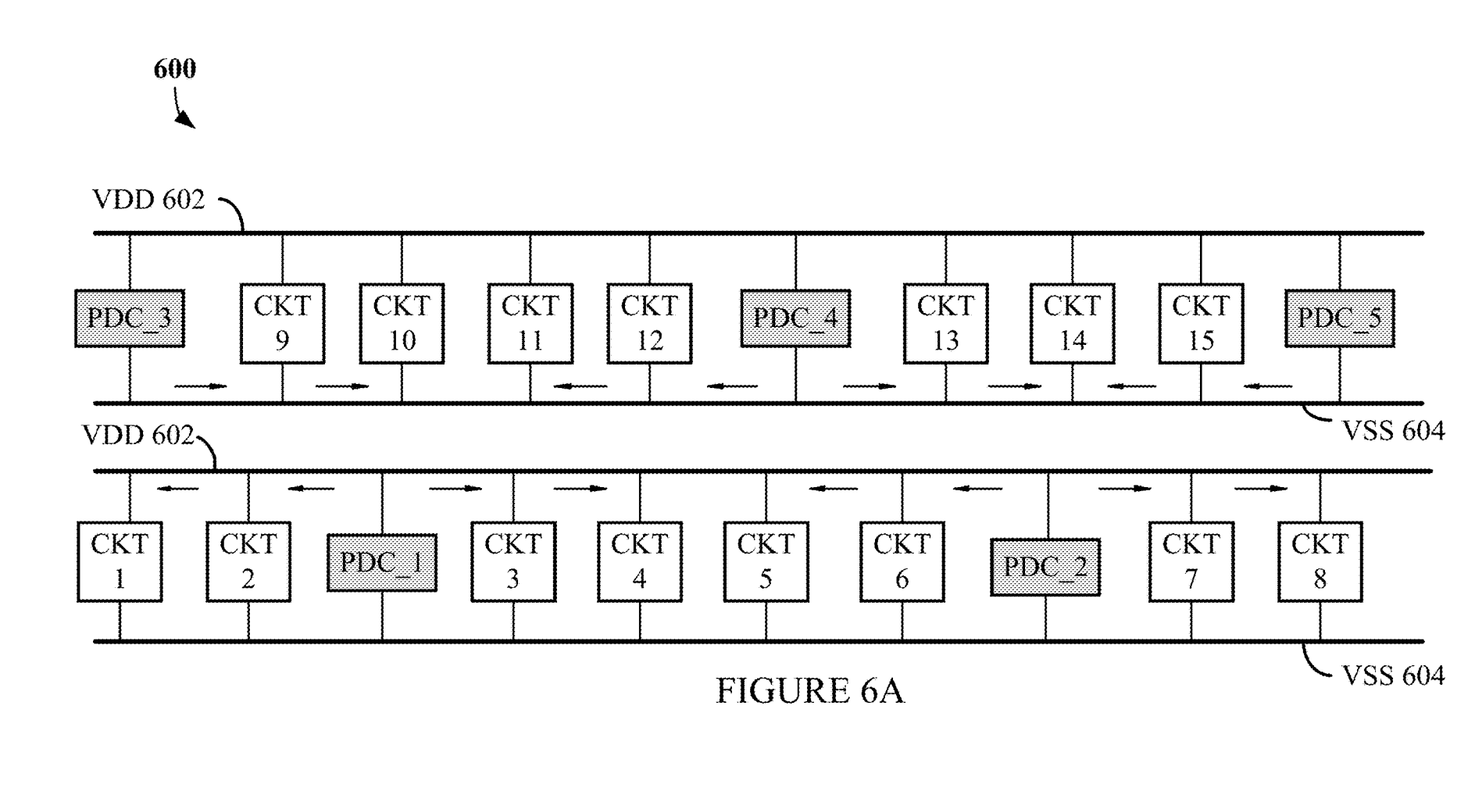
FIG. 6A shows a top view of an example circuit block sub-region with optimized mitigation of electromagnetic emission on the power lines.

FIG. 6A shows a top view of an example circuit block sub-region with optimized mitigation of electromagnetic emission on the power lines. Sub-region 600 shows a configuration with two rows of sub-circuits where each row of sub-circuits has a voltage source line $V_{DD}$ 602 and a first voltage line $V_{SS}$ 604. In this layout, a $V_{DD}$ 602 line is adjacent a $V_{SS}$ 604 line. Sub-circuits CKT1-CKT8 and PDCs PDC_1-PDC_2, are arranged in one row. Sub-circuits CKT9-CKT15 and PDCs PDC_3-PDC_5 are arranged in the other row. The direction of electromagnetic flux along the power lines is shown by the arrows. As shown, the direction of the arrows on the top row of the sub-region is opposing the direction of the arrows on the bottom row of the sub-region. By placing and routing the PDCs in this manner, the electromagnetic flux along the power supply lines can be reduced or even cancelled.

Figure 6B:
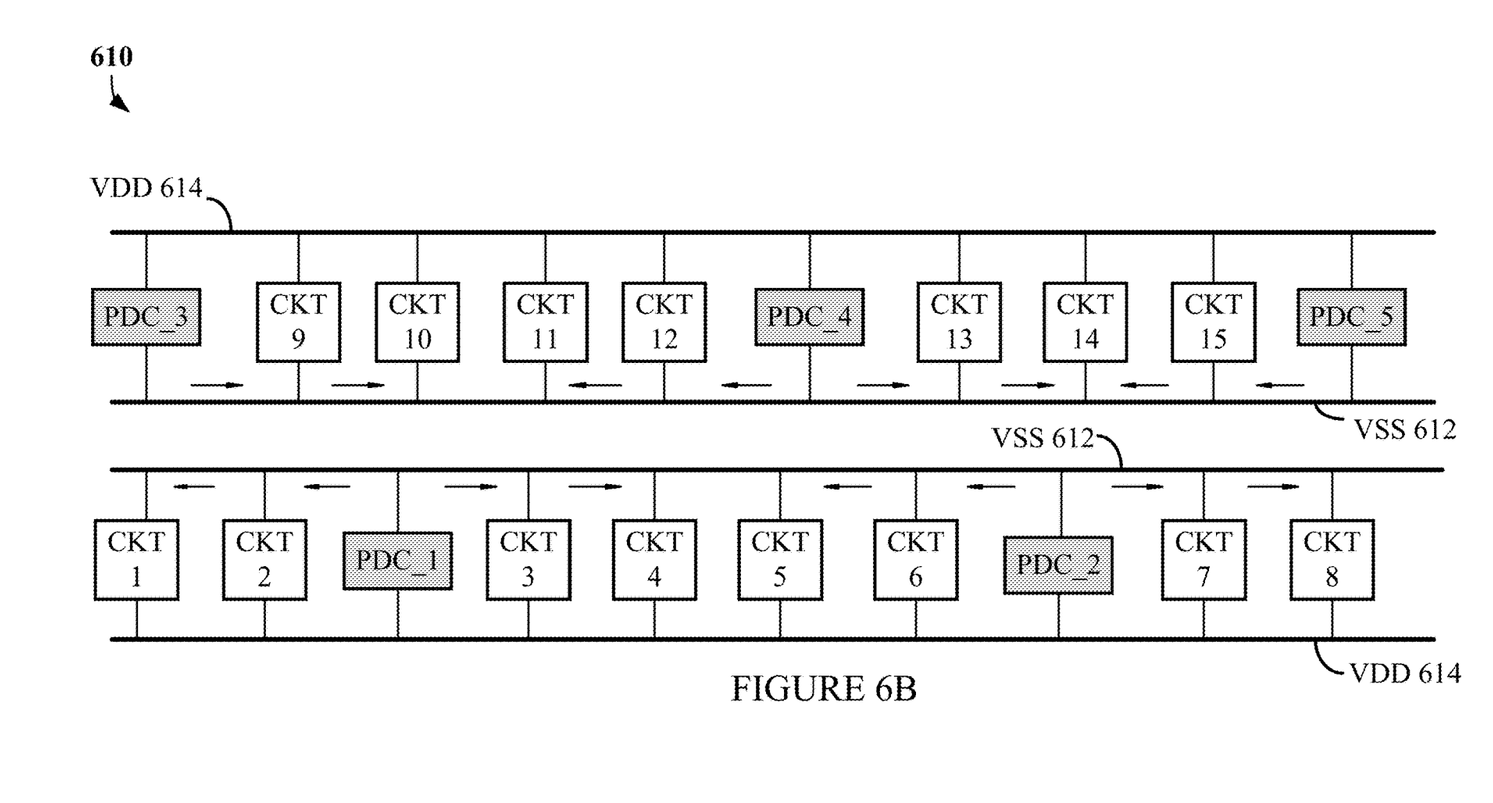
FIG. 6B shows a top view of another example circuit sub-region with optimized mitigation of electromagnetic emission on the power lines.

FIG. 6B shows a top view of another example circuit sub-region with optimized mitigation of electromagnetic emission on the power lines. Here, the sub-region 610 of a circuit block is arranged with the $V_{SS}$ 612 lines adjacent to each other and the $V_{DD}$ 614 lines adjacent to each other. As with the example in FIG. 6A, sub-circuits and PDCs can be arranged such that the electromagnetic flux along the power lines are in opposite directions.

Figure 6C:
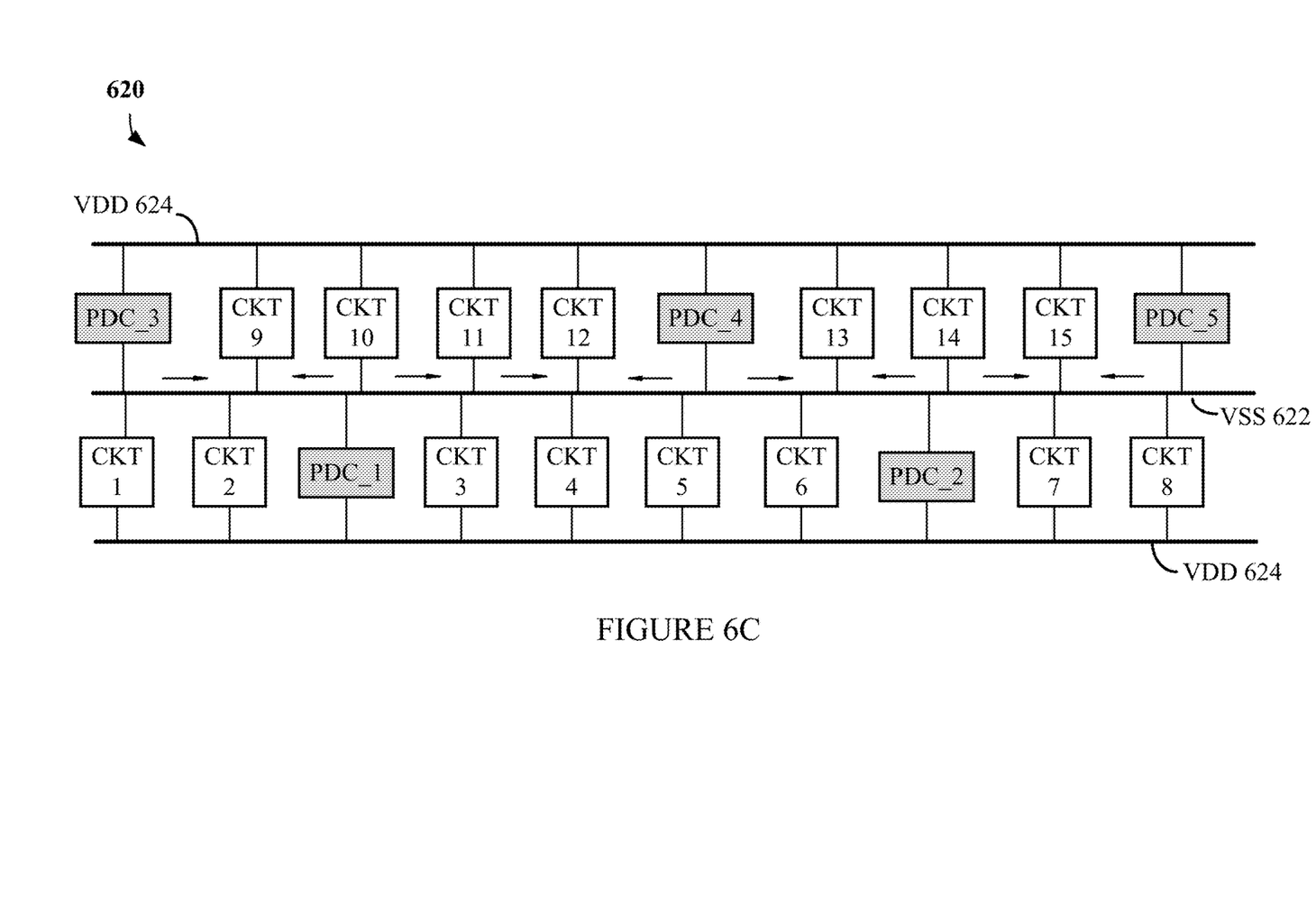
FIG. 6C shows top view of yet another example circuit sub-region with optimized mitigation of electromagnetic emission on the power lines.

FIG. 6C shows top view of a yet another example circuit sub-region with optimized mitigation of electromagnetic emission on the power lines. In FIG. 6C, sub-region 620 includes two rows of sub-circuits, where the sub-circuits share a first voltage line $V_{SS}$ 622. In some cases, other rows of sub-circuits (not shown) may be included that share the voltage source line $V_{DD}$ 624. As with the examples in FIGS. 6A and 6B, sub-circuits and PDCs can be arranged such that the electromagnetic flux along the shared power lines are in opposite directions.

While the mitigation of electromagnetic radiation susceptibility has been discussed thus far, other applications may also benefit from reduced electromagnetic emissions on power lines. For example, the analog front end (AFE) components of radio frequency (RF) circuits can be very sensitive to electromagnetic radiation. Crosstalk between neighboring circuit components is a negative effect of this electromagnetic radiation. Common techniques, such as shielding, aim to protect the AFE from radiation emitted from the digital logic components of the RF circuit. Another approach, independently, or in addition to shielding can be to incorporate PDCs in the AFE. By placing PDCs along the same power lines as the digital logic components, the electromagnetic flux, and thus the electromagnetic emission, from the components may be reduced, resulting in reduced crosstalk in the AFE. Reducing the electromagnetic flux on the power lines may also allow digital logic circuitry to be placed in closer proximity to the AFE circuitry in an RF application, thus reducing chip size.

Any reference in this specification to "one embodiment," "an embodiment," "example embodiment," "an example", "some examples", etc., means that a particular feature, structure, or characteristic described in connection with the embodiment or example is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A power line comprising:
   at least two segments;

at least one power delivery circuit (PDC) coupled to the power line at a location to create a respective electromagnetic flux on two adjacent segments of the at least two segments that is in opposite directions, wherein the two adjacent segments are connected in series.

2. A system, comprising:
a functional circuit block comprising two or more sub-circuits; a power line comprising at least two segments, a first sub-circuit of the two or more sub-circuits being coupled to a first segment of the at least two segments, and a second sub-circuit of the two or more sub-circuits being coupled to a second segment of the at least two segments,
wherein at least two adjacent segments of the at least two segments are connected in series; and
at least one power delivery circuit (PDC) coupled to the power line at a location to create a respective electromagnetic flux on the at least two adjacent segments of the at least two segments that is in opposite directions.

3. The system of claim 1, wherein the functional circuit block is an analog front end of a radio frequency device.

4. The system of claim 1, wherein the power line is in the form of a mesh.

5. The system of claim 1, further comprising a control circuit coupled to one or more of the at least one PDC.

6. The system of claim 1, wherein the functional circuit block is an analog circuit, a digital circuit, or a mixed signal circuit.

7. The system of claim 1, wherein a PDC of the at least one PDCs comprises at least one capacitor.

8. The system of claim 7, further comprising a control circuit to recharge the at least one capacitor.

9. The system of claim 1, wherein a PDC of the at least one PDC comprises at least one transistor.

10. The system of claim 9, further comprising a control circuit to drive the at least one transistor.

* * * * *